US009323476B2

(12) United States Patent
Simionescu et al.

(10) Patent No.: US 9,323,476 B2
(45) Date of Patent: Apr. 26, 2016

(54) HARDWARE BASED CACHE SCAN WITH DIVERT NODE HANDLING

(71) Applicant: LSI Corporation, San Jose, CA (US)

(72) Inventors: Horia C. Simionescu, Foster City, CA (US); James Yu, Houston, TX (US); Robert L. Sheffield, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 434 days.

(21) Appl. No.: 13/917,735

(22) Filed: Jun. 14, 2013

(65) Prior Publication Data

US 2014/0365736 A1 Dec. 11, 2014

Related U.S. Application Data

(60) Provisional application No. 61/833,309, filed on Jun. 10, 2013.

(51) Int. Cl.
*G06F 13/00* (2006.01)
*G06F 3/06* (2006.01)

(52) U.S. Cl.
CPC ............ *G06F 3/0683* (2013.01); *G06F 3/0613* (2013.01); *G06F 3/0619* (2013.01); *G06F 3/0659* (2013.01)

(58) Field of Classification Search
CPC ......... G06F 12/00; G06F 12/08; G06F 13/14; G06F 118/16
See application file for complete search history.

(56) References Cited

U.S. PATENT DOCUMENTS

| 6,529,983 B1 * | 3/2003 | Marshall et al. ............... 710/200 |
| 2010/0268904 A1 * | 10/2010 | Sheffield et al. ............... 711/163 |
| 2012/0023295 A1 * | 1/2012 | Nemawarkar ................ 711/130 |

* cited by examiner

*Primary Examiner* — Charles Rones
*Assistant Examiner* — Han Doan

(57) ABSTRACT

Methods for managing region lock in a storage controller are disclosed. Upon receiving in a hardware based region lock management circuit a data request, the region lock management circuit determines a lock type of a region lock specified in the data request and conditionally creates a region lock data structure, wherein the region lock data structure is conditionally created based on the type of the region lock requested. The region lock management circuit further determines whether the data request is requesting access to at least a portion of a locked data region and the lock type of the locked data region. If the data request is requesting access to at least a portion of the locked data region and the lock type of the locked data region permits firmware diversion, the region lock management circuit diverts the data request to a storage controller firmware processor for further processing.

21 Claims, 3 Drawing Sheets ly, an embodiment of the present disclosure is directed to method for managing region lock in a storage controller. The method includes receiving in a hardware based region lock management circuit a data request from a data requester. The hardware based region lock management circuit determines whether a lock type of a region lock specified in the data request is for diversion check. The hardware based region lock management circuit further determines whether the data request is requesting access to at least a portion of a locked data region. If the lock type of the region lock specified in the data request is for diversion check and the data request is requesting access to at least a portion of the locked data region, the hardware based region lock management circuit diverts the data request to the storage controller firmware processor without creating a region lock data structure. Otherwise, if the type of the region lock requested is for diversion check and the data request is not requesting access to at least a portion of the locked data region, the hardware based region lock management circuit sends the data request for execution without creating a region lock data structure.

A further embodiment of the present disclosure is directed to a method for managing region lock in a storage controller. The method includes receiving in a hardware based region lock management circuit a first data request. The hardware based region lock management circuit determines a lock type of a region lock specified in the first data request, creates a region lock data structure representing the region lock specified in the first data request, and grants a region lock to the first data request to temporarily lock a data region when no region lock request conflict is detected. The method further includes receiving in the hardware based region lock management circuit a second data request. The hardware based region lock management circuit determines whether the second data request is requesting access to at least a portion of the data region temporarily locked by the first data request. If the second data request is requesting access to at least a portion of the data region temporarily locked by the first data request and the lock type of the region lock specified in the first data request permits firmware diversion, the hardware based region lock management circuit diverts the second data request from the hardware based region lock management circuit to a storage controller firmware processor.

An additional embodiment of the present disclosure is also directed to a method for managing region lock in a storage controller. The method includes receiving in a hardware based region lock management circuit a data request from a data requester. The hardware based region lock management circuit determines a lock type of a region lock specified in the data request and conditionally creates a region lock data structure representing the region lock specified in the data request, wherein the region lock data structure is conditionally created based on the type of the region lock requested. The hardware based region lock management circuit further determines whether the data request is requesting access to at least a portion of a locked data region and the lock type of the locked data region. If the data request is requesting access to at least a portion of the locked data region and the lock type of the locked data region permits firmware diversion, the hardware based region lock management circuit diverts the data request from the hardware based region lock management circuit to a storage controller firmware processor.

An additional embodiment of the present disclosure is directed to a storage controller. The storage controller includes a region lock memory for storing region lock data structures, a storage controller firmware processor communicatively coupled with the region lock memory, and a hardware based region lock management circuit communicatively coupled with the region lock memory and the storage controller firmware processor. The hardware based region lock management circuit is configured for providing region lock management assistance to the storage controller firmware processor. The hardware based region lock management circuit includes: means for receiving a data request from a data requester, means for determining a lock type of a region lock specified in the data request, means for conditionally creating a region lock data structure representing the region lock specified in the data request, wherein the region lock data structure is conditionally created based on the type of the region lock requested, means for determining whether the data request is requesting access to at least a portion of a locked data region, means for determining a lock type of the locked data region, and means for diverting the data request from the hardware based region lock management circuit to a storage controller firmware processor when the data request is requesting access to at least a portion of the locked data region and the lock type of the locked data region permits firmware diversion.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

A region lock is a temporary lock applied on a region of stored data to allow one data request to access the data while other requests are held off by the temporary lock. In accordance with an embodiment of the present disclosure, a hardware based region lock management circuit is utilized to manage region locks. The purpose of utilizing a hardware based region lock management circuit is to provide assistance to the storage controller firmware, which would otherwise have to handle the region lock management itself. By handing some of the responsibilities to the hardware, the performance of the storage controller is greatly improved.

Figure 1:
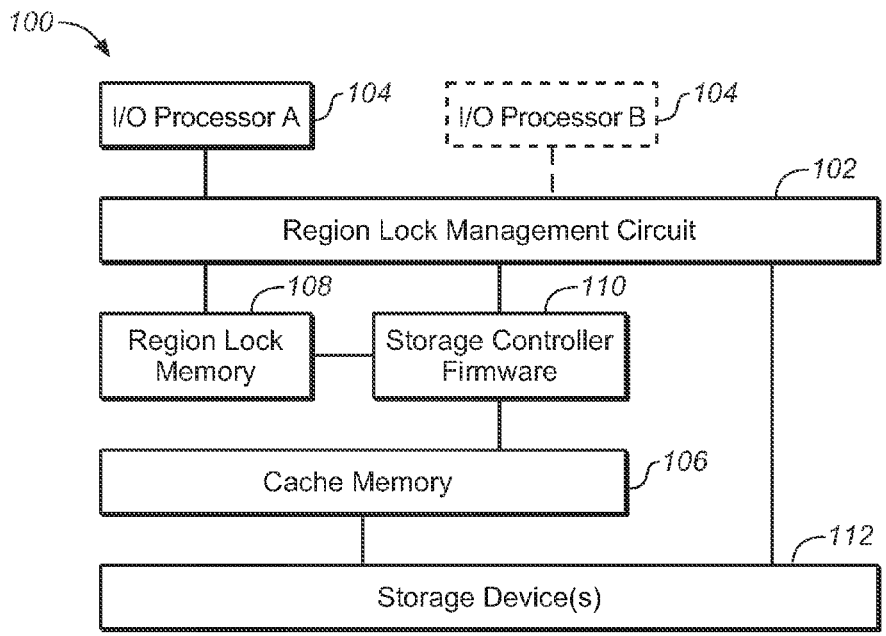
FIG. 1 is a block diagram illustrating a storage controller utilizing a hardware based region lock management circuit, wherein a hardware based data access acceleration technique capable of handling I/O requests without any firmware control is supported.

FIG. 1 is a block diagram illustrating a storage controller 100 utilizing a hardware based region lock management circuit 102. As illustrated in FIG. 1, one or more input/output (I/O) processors 104 can transmit requests to the region lock management circuit 102 to request a temporary lock for a region of storage on a volume of the data storage device 106. The region lock management circuit 102 determines whether the requested lock can be granted or whether it conflicts with other presently locked regions. Presently locked regions and regions to be locked are represented by region lock data structures recorded in the region lock memory 108.

An exemplary hardware based region lock management circuit is described in: Apparatus and Methods for Region Lock Management Assist Circuit in a Storage System, Robert Sheffield et al., U.S. patent application Ser. No. 12/760,434, which is herein incorporated by reference in its entirety. While such a hardware based region lock management circuit is capable of maintaining the locks, it is contemplated, however, that in some situations it is desirable to let a data request to still go to the firmware 110 for further processing even if that data request may appear to overlap with a pre-existing request.

For instance, diverting a data request from the region lock management circuit 102 to the firmware 110 allows the firmware 110 to handle potentially overlapping requests, therefore, providing more processing flexibilities and allowing the firmware 110 to decide whether the subsequent request indeed needs to be blocked or can be at least partially executed. In accordance with an embodiment of the present disclosure, a type of region lock referred to as DIVERT region lock is utilized to facilitate this processing configuration.

More specifically, suppose a first request received at the region lock management circuit 102 is a write request to logical address blocks LBA100 to LBA200 with a DIVERT region lock. A region lock data structure representing the first request is created and recorded in the region lock memory 108. Suppose a second request is received prior to the release of the region lock granted to the first request, and suppose the address range requested by the second request is LBA150 to LBA250, thus an overlap is detected. In accordance with an embodiment of the present disclosure, because the region lock granted to the first request is a DIVERT region lock, this region lock type is recognized by the region lock management circuit 102, which then diverts the second request to the firmware 110 for further processing.

It is contemplated that supporting the DIVERT region lock type and allowing the firmware 110 to handle potentially overlapping requests provides advantages in various situations. When the DIVERT region lock is used, a subsequent request is not automatically suspended/blocked by the region lock management circuit 102 just because it appears to have an overlapping address range. Instead, the request is diverted to the firmware 110, which has more processing flexibilities and is capable of making more informed decisions as to whether the subsequent request indeed needs to be blocked or can be at least partially executed.

While supporting the DIVERT region lock improves system performance by taking advantages of both the region lock management circuit 102 and the firmware processor 110, it is noted that a request with a DIVERT region lock still creates a region lock data structure that consumes time and resources. That is, a region lock data structure needs to be created, recorded, maintained and subsequently deleted (at a later time) from the region lock memory 108. In addition, if the region lock memory 108 maintains the region lock data structures in a tree structure (e.g., an AVL tree or the like), maintaining a balanced tree structure is also an expensive operation.

In accordance with an embodiment of the present disclosure, a type of region lock referred to as DIVERT_CHECK is utilized to further improve the performance of the storage controller 100. A request with a DIVERT_CHECK region lock does not create any new data structure for insertion into the region lock memory 108. Instead, a request with a DIVERT_CHECK region lock solely needs to access the region lock memory 108 (e.g., traverse the AVL tree) to detect potential overlaps.

For instance, the data requester (e.g., host or initiator) can issue a read request with a DIVERT_CHECK type of region lock. When the region lock management circuit 102 recognizes that the lock type of the request is DIVERT_CHECK, the region lock management circuit 102 only needs to traverse and check for potential overlaps. More specifically, the region lock management circuit 102 traverses the region lock memory 108 and determines whether the particular address range requested overlaps with any locked region. If no overlap is detected, the region lock management circuit 102 directly sends the request for execution without creating a region lock data structure for it. On the other hand, if an overlap is detected, the region lock management circuit 102 diverts the request to the firmware 110 to handle the overlap without creating a region lock data structure for it either.

To further expedite the process, if an overlap is detected, a reference (e.g., pointer) to the colliding data structure(s) in the region lock memory 108 is also directed to the firmware 110. When the firmware 110 receives the incoming read request, it checks the region lock memory 108 to identify the potential overlaps. If such a reference exists, the read request can be processed as a full or partial cache hit. Otherwise, the read request is processed as a cache miss.

Utilizing the DIVERT_CHECK region lock type in this manner eliminates the need to create, insert or delete region lock data structures in the region lock memory 108. Utilizing the DIVERT_CHECK region lock also helps reducing the amount of time needed for traversing and checking the region lock memory 108 because the number of region lock data structures stored in the region lock memory 108 is also reduced (i.e., less records created and therefore less records to traverse). Furthermore, if the region lock memory 108 implements a balanced tree structure, utilizing the DIVERT_CHECK region lock also eliminates the need to perform unnecessary tree balancing operations which are time and resource consuming.

It is contemplated that utilizing the DIVERT and DIVERT_CHECK region lock types as describe above allows caching to be used in conjunction with a fast-path data access mechanism. A fast-path data access mechanism refers to hardware based data access acceleration techniques that are capable of handling I/O requests without any firmware/software control. Such a fast-path data access mechanism is represented as a direct link between the hardware based region lock management circuit 102 and the storage device(s) 112 in FIG. 1 for illustrative purposes. While such a hardware based data access mechanism is capable of providing fast data access speeds, ensuring data integrity in the cache when fast-path is enabled is very difficult to the point where fast-path has to be disable if there is caching. Utilizing the DIVERT and DIVERT_CHECK region lock types allows fast-path to be enable even with caching because any potential conflicts that may occur can be diverted and handled by the storage controller firmware to ensure data integrity. For instance, with the support of DIVERT_CHECK, the fast-path is utilized only if no overlap is detected by the region lock management circuit 102. If an overlap is detected, the region lock management circuit 102 diverts the request to the firmware 110 to handle any potential conflicts.

It is noted that the DIVERT and DIVERT_CHECK region lock types described above are both set by the data requester (e.g., using the region lock flag associated with each data request). This is beneficial as it provides the data requesters a mechanism to specify whether and how they want the hardware based region lock management circuit 102 to divert any of their data requests to the firmware 110.

It is contemplated that supporting the DIVERT and DIVERT_CHECK region lock types allows the storage controller 100 to take advantages of both the region lock management circuit 102 and the firmware processor 110. That is, the hardware based region lock management circuit 102 can still be used to maintain the data structures recorded in the region lock memory 108, while the more flexible firmware processor 110 can be used to resolve address range conflicts/overlaps, further improving the performance of the storage controller 100.

For instance, the firmware 110 has the option to coalesce the overlapping requests into only one request for processing. In addition, base on the specific write policy implemented (e.g., write-back or write-through), when the data request is completed, the firmware 110 has the choice to: 1) not free up the associated region lock data structures in the region lock memory 108 in order to represent the write cached data, or 2) insert a replacement region lock data structure into the region lock memory 108 and then free up the associated region lock data structures. Furthermore, after the firmware 110 has flushed the cached data to a lower level storage device, it can then delete the region lock data structure(s) or choose to keep the region lock data structure(s) for potential cache read hits. It is contemplated that the actions taken by the firmware 110 as described above are merely exemplary, and that the specific actions taken by the firmware 110 regarding the diverted requests are application specific and can vary without departing from the spirit and scope of the present disclosure.

It is also contemplated that in certain embodiments the firmware 110 is also able to insert data structure(s) into the region lock memory 108 to manually trigger diversion of requests. For instance, suppose the write policy implemented is write-back and the firmware 110 is ready to flush address range LBA100 through LBA200. To take advantage of the DIVERT region lock type, the firmware 110 can insert a DIVERT type region lock data structure for LBA100 through LBA200 into the region lock memory 108 and then start the write-back process. This firmware-inserted data structure indicates that any subsequent requests that overlap LBA100 through LBA200 should be diverted to the firmware 110 for further processing. This allows the firmware 110 to handle such diverted requests in the cache even before the write-back (flush) is completed. Upon completion of the write-back, the firmware 110 can remove the inserted data structure and normal operations resume.

It is contemplated that the firmware-initiated diversion described above is merely exemplary. That is, the firmware 110 should be able to utilize this mechanism in various ways without departing from the spirit and scope of the present disclosure.

It is also contemplated that the hardware based region lock management circuit 102 configured to recognize the DIVERT and DIVERT_CHECK region lock types can be implemented as a part of a storage controller in various types of storage devices such as cache, memory or the like. The lover level storage device may also vary without departing from the spirit and scope of the present disclosure. For instance, the storage devices may include, but not limited to, Redundant Array of Independent Disks (RAID), Solid State Drives (SSD), hard disks, logical disks or the like.

Furthermore, it is understood that the region lock memory 108 utilizes certain data structures to record and maintain the region lock data stored therein. While a tree structure (e.g., an AVL tree or the like) is referenced in the description above, it is contemplated that various other types of data structures can also be utilized without departing from the spirit and scope of the present disclosure.

Figure 2:
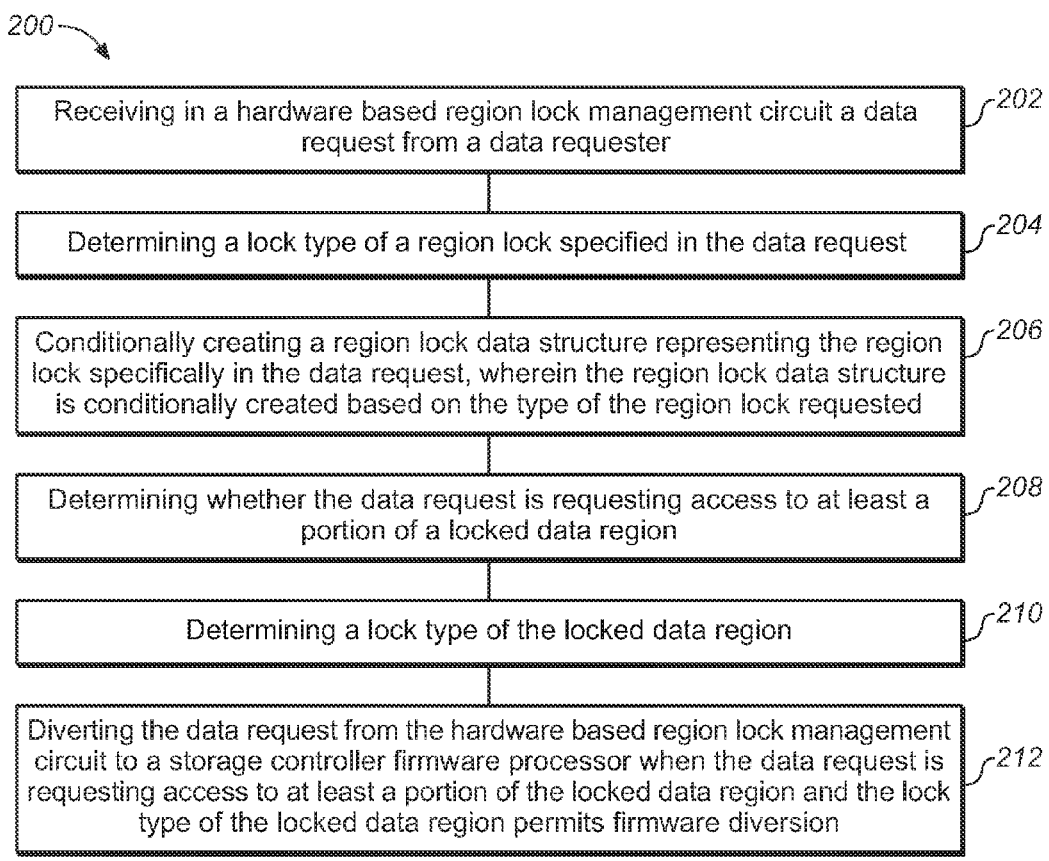
FIG. 2 is a flow diagram illustrating operations of a hardware based region lock management circuit with divert node handling.

FIG. 2 is a flow diagram illustrating a method for managing region locks in a storage controller. In accordance with one embodiment of the present disclosure, a hardware based region lock management circuit first receives a data request from a data requester in step 202. Step 204 then determines the type of the region lock specified in the data request. Step 206 conditionally creates a region lock data structure representing the region lock specified in the data request. As described above, no region lock data structure is created for a diversion check lock type (referenced as DIVERT_CHECK above). On the other hand, DIVERT lock type requires a corresponding region lock data structure to be created.

The hardware based region lock management circuit then determines in step 208 whether the data request currently being processed is requesting access to any portion of a locked data region. This can be determined based on the information recorded in the region lock memory as described above. If an overlap/conflict is detected, step 210 subsequently determines the type of lock associated with the locked data region. If the data request currently being processed is requesting access to a data region locked by a DIVERT region lock, the hardware based region lock management circuit subsequently diverts the data request to the storage controller firmware processor in step 212 for further processing as previously described.

Figure 3:
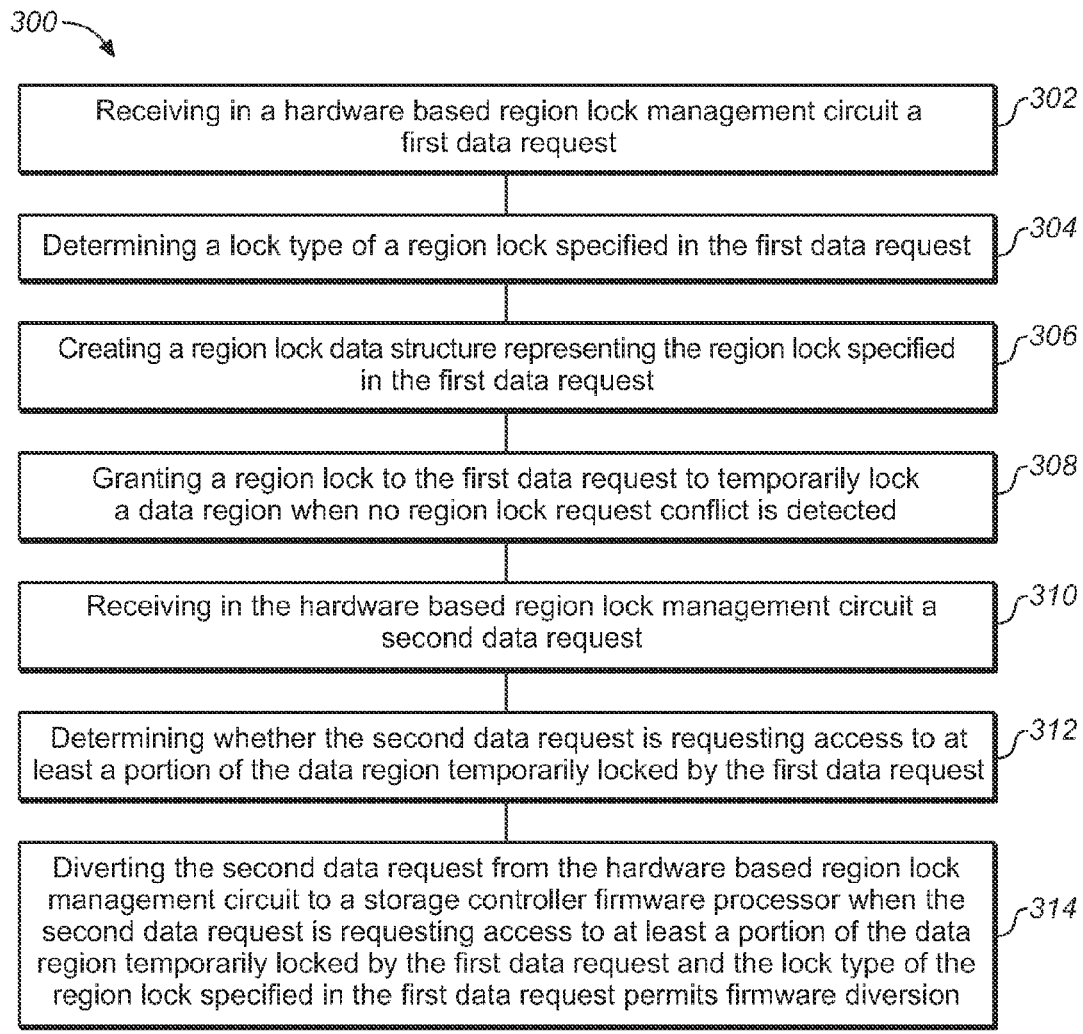
FIG. 3 is another flow diagram illustrating operations of a hardware based region lock management circuit with divert node handling.

FIG. 3 is a flow diagram further illustrating the method for managing DIVERT region locks in a storage controller. As shown in FIG. 3, the hardware based region lock management circuit receives a first data request from a data requester in step 302. Step 304 then determines the type of the region lock specified in the first data request. Step 306 creates a region lock data structure representing the region lock specified in the first data request unless the region lock type is diversion check. Subsequently, if no region lock request conflict is detected, step 308 grants the region lock to the first data request and locks the requested data region.

Upon receiving a second data request either from the same or a different data requester in step 310, the hardware based region lock management circuit determines whether the second data request is requesting access to at least a portion of the data region temporarily locked by the first data request in step 312. If the second data request is requesting access to at least a portion of the data region temporarily locked by the first data request using a DIVERT region lock, the hardware based region lock management circuit subsequently diverts the second data request to the storage controller firmware processor in step 314 for further processing.

Figure 4:
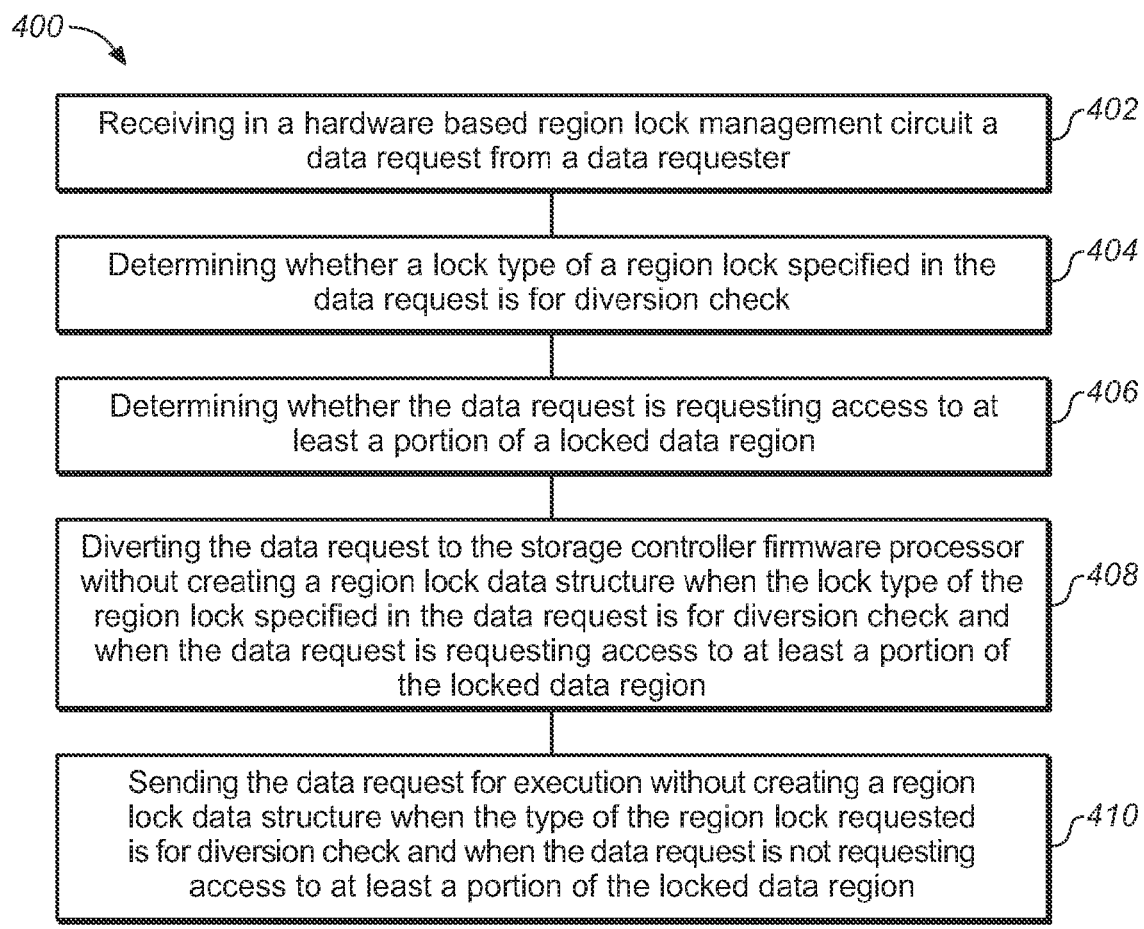
FIG. 4 is a flow diagram illustrating operations of a hardware based region lock management circuit with divert check node handling.

FIG. 4 is a flow diagram further illustrating the method for managing DIVERT_CHECK region locks in a storage controller. As shown in FIG. 4, the hardware based region lock management circuit receives a data request from a data requester in step 402. Step 404 determines whether the type of the region lock specified in the data request is DIVERT_CHECK and step 406 determines whether the data request currently being processed is requesting access to any portion of a locked data region. As previously described, if the lock type is DIVERT_CHECK and if the data request is requesting access to at least a portion of the locked data region, step 408 diverts the data request to the storage controller firmware processor without creating a region lock data structure. On the other hand, if the lock type is DIVERT_CHECK and if the data request is not requesting access to any portion of the locked data region, the region lock management circuit directly sends the request for execution in step 410 without creating a region lock data structure for it either.

It is contemplated that the methods described above are implemented in forms of various circuitry components in the hardware based region lock management circuit. For instance, various circuitry components can be configured for providing the functions described in the flow diagrams above. It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for managing region lock in a storage controller, the method comprising:
    receiving in a hardware based region lock management circuit a data request from a data requester;
    determining a lock type of a region lock specified in the data request, the lock type of the region lock indicating whether the data requester intends for the data request to be diverted to a storage controller firmware processor upon detection of a region lock conflict, the lock type of the region lock further indicating whether the data requester intends for the diversion to be performed as diversion check without creating a region lock data structure;
    determining whether the data request is requesting access to at least a portion of a locked data region;
    diverting the data request and providing a reference to at least the portion of the locked data region to the storage controller firmware processor without creating the region lock data structure when the lock type of the region lock specified in the data request indicates the data requester intends for the diversion to be performed as diversion check and when the data request is requesting access to at least the portion of the locked data region; and
    handling the data request utilizing the hardware based region lock management circuit without diverting the data request to the storage controller firmware processor when the type of the region lock specified in the data request indicates the data requester does not intend for the data request to be diverted to the storage controller firmware processor upon detection of the region lock conflict.

2. The method of claim 1, wherein the hardware based region lock management circuit is a component of a hardware-assisted fast-path data access mechanism.

3. The method of claim 1, wherein the reference to at least the portion of the locked data region includes a pointer to region lock data stored in a region lock memory.

4. The method of claim 1, wherein the locked data region is granted to a previously received data request.

5. The method of claim 1, wherein determining whether the data request is requesting access to at least a portion of a locked data region includes traversing a plurality of region lock data structures recorded and maintained in a region lock memory accessible to the hardware based region lock management circuit.

6. The method of claim 5, wherein the plurality of region lock data structures is recorded and maintained in a tree structure in the region lock memory.

7. A method for managing region lock in a storage controller, the method comprising:
    receiving in a hardware based region lock management circuit a first data request;
    determining a lock type of a region lock specified in the first data request, the lock type of the region lock indicating whether a second data request requesting access to at least a portion of the region lock specified in the first data request is permitted to be diverted to a storage controller firmware processor;
    creating a region lock data structure representing the region lock specified in the first data request;
    granting a region lock to the first data request to lock a data region when no region lock request conflict is detected;
    receiving in the hardware based region lock management circuit the second data request requesting access to at least the portion of the region lock specified in the first data request;
    diverting the second data request requesting access to at least a portion of the region lock specified in the first data request from the hardware based region lock management circuit to the storage controller firmware processor when the lock type of the region lock specified in the first data request permits the second data request to be diverted to the storage controller firmware processor, a reference to the region lock specified in the first data request is provided to the storage controller firmware processor; and handling the second data request requesting access to at least the portion of the region lock specified in the first data request utilizing the hardware based region lock management circuit without diverting the second data request to the storage controller firmware processor when the lock type of the region lock specified in the first data request does not permit the second data request to be diverted to the storage controller firmware processor.

8. The method of claim 7, wherein diverting the second data request from the hardware based region lock management circuit to a storage controller firmware processor further comprises:

determining whether a lock type of a region lock specified in the second data request is for diversion check; and when the lock type of the region lock specified in the second data request is for diversion check, diverting the second data request from the hardware based region lock management circuit to the storage controller firmware processor without creating a region lock data structure representing the region lock specified in the second data request.

9. The method of claim 7, wherein diverting the second data request from the hardware based region lock management circuit to a storage controller firmware processor further comprises:

determining whether a lock type of a region lock specified in the second data request is for diversion check;

when the lock type of the region lock specified in the second data request is not for diversion check, creating a region lock data structure representing the region lock specified in the second data request; and diverting the second data request from the hardware based region lock management circuit to the storage controller firmware processor with a reference to the region lock data structure created for the second data request.

10. The method of claim 7, wherein the region lock data structure created for a data request is recorded and maintained in a region lock memory accessible to the hardware based region lock management circuit and the storage controller firmware processor.

11. The method of claim 10, wherein the region lock data structure is recorded and maintained in a tree structure in the region lock memory.

12. A method for managing region lock in a storage controller, the method comprising:

receiving in a hardware based region lock management circuit a data request from a data requester;

determining a lock type of a region lock specified in the data request;

conditionally creating a region lock data structure representing the region lock specified in the data request, wherein the region lock data structure is conditionally created based on the type of the region lock requested;

determining whether the data request is requesting access to at least a portion of a locked data region;

determining a lock type of the locked data region, the lock type of the locked data region indicating whether the data request is permitted to be diverted to a storage controller firmware processor;

diverting the data request from the hardware based region lock management circuit to the storage controller firmware processor and a reference for accessing the region lock data structure created for the data request is provided to the storage controller firmware processor when the data request is requesting access to at least the portion of the locked data region and the lock type of the locked data region permits the data request to be diverted; and handling the data request utilizing the hardware based region lock management circuit without diverting the data request to the storage controller firmware processor when the lock type of the locked data region does not permit the data request to be diverted.

13. The method of claim 12, wherein the region lock data structure created for a data request is recorded and maintained in a region lock memory accessible to the hardware based region lock management circuit and the storage controller firmware processor.

14. The method of claim 12, wherein the reference for accessing the region lock data structure includes a pointer to region lock data stored in a region lock memory.

15. The method of claim 12, wherein the locked data region is granted to a previously received data request and said previously received data request specifies a region lock that indicates whether the data request is permitted to be diverted to the storage controller firmware processor.

16. The method of claim 12, wherein no region lock data structure is created when the type of the region lock requested is for diversion check.

17. The method of claim 16, wherein when the type of the region lock requested is for diversion check and when the data request is requesting access to at least a portion of the locked data region, the hardware based region lock management circuit diverts the data request to the storage controller firmware processor.

18. The method of claim 16, wherein when the type of the region lock requested is for diversion check and when the data request is not requesting access to at least a portion of the locked data region, the hardware based region lock management circuit directly sends the data request for execution.

19. The method of claim 12, wherein determining whether the data request is requesting access to at least a portion of a locked data region includes traversing region lock data structures recorded and maintained in a region lock memory accessible to the hardware based region lock management circuit.

20. The method of claim 19, wherein the region lock data structures are recorded and maintained in a tree structure in the region lock memory.

21. A storage controller, comprising:

a region lock memory for storing region lock data structures;

a storage controller firmware processor communicatively coupled with the region lock memory; and a hardware based region lock management circuit communicatively coupled with the region lock memory and the storage controller firmware processor;

wherein the hardware based region lock management circuit is configured for providing region lock management assistance to the storage controller firmware processor, the hardware based region lock management circuit further comprising:

circuitry for receiving a data request from a data requester;

circuitry for determining a lock type of a region lock specified in the data request;

circuitry for conditionally creating a region lock data structure representing the region lock specified in the data request, wherein the region lock data structure is conditionally created based on the type of the region lock requested;

circuitry for determining whether the data request is requesting access to at least a portion of a locked data region;

circuitry for determining a lock type of the locked data region, the lock type of the locked data region indicating whether the data request is permitted to be diverted to a storage controller firmware processor;

circuitry for diverting the data request from the hardware based region lock management circuit to the storage controller firmware processor and a reference for accessing the region lock data structure created for the data request is provided to the storage controller firmware processor when the data request is requesting access to at least the portion of the locked data region and the lock type of the locked data region permits the data request to be diverted; and circuitry for handling the data request utilizing the hardware based region lock management circuit without diverting the data request to the storage controller firmware processor when the lock type of the locked data region does not permit the data request to be diverted.

* * * * *